US011321535B2

(12) United States Patent
Elson et al.

(10) Patent No.: US 11,321,535 B2
(45) Date of Patent: May 3, 2022

(54) HIERARCHICAL ANNOTATION OF DIALOG ACTS

(71) Applicant: Google LLC, Mountain View, CA (US)

(72) Inventors: David Elson, Port Washington, NY (US); Benjamin Ross, New York, NY (US); David Eisenberg, New York, NY (US); Raj Agarwal, Fremont, CA (US)

(73) Assignee: GOOGLE LLC, Mountain View, CA (US)

( * ) Notice: Subject to any disclaimer, the term of this patent is extended or adjusted under 35 U.S.C. 154(b) by 336 days.

(21) Appl. No.: 16/337,830

(22) PCT Filed: Sep. 28, 2017

(86) PCT No.: PCT/US2017/053909
§ 371 (c)(1),
(2) Date: Mar. 28, 2019

(87) PCT Pub. No.: WO2018/067368
PCT Pub. Date: Apr. 12, 2018

(65) Prior Publication Data
US 2020/0012720 A1     Jan. 9, 2020

Related U.S. Application Data

(63) Continuation of application No. 15/717,355, filed on Sep. 27, 2017, now abandoned.
(Continued)

(51) Int. Cl.
*G06F 17/27* (2006.01)
*G06F 40/35* (2020.01)
*G06F 16/31* (2019.01)

(52) U.S. Cl.
CPC .......... *G06F 40/35* (2020.01); *G06F 16/322* (2019.01)

(58) Field of Classification Search
CPC ...... G06F 17/279; G06F 16/322; G06F 3/167; G06F 40/35; G10L 13/02; G10L 15/1822;
(Continued)

(56) References Cited

U.S. PATENT DOCUMENTS 11,094,320 B1 * 8/2021 Jain ......................... G10L 15/22
2005/0053283 A1 * 3/2005 Wakeam ............... G01B 21/30
382/186
(Continued)

FOREIGN PATENT DOCUMENTS

CN      104462024      3/2015

OTHER PUBLICATIONS

United Kingdom Intellectual Property Office; Office Action issued in Application No. 1715647.2 dated Jan. 29, 2020.
China National Intellectual Property; Notification of First Office Action issue in Application No. 201710914486.3; 22 pages; dated Aug. 12, 2020.
(Continued)

Primary Examiner — Md S Elahee
(74) Attorney, Agent, or Firm — Middleton Reutlinger

(57) ABSTRACT

Systems and methods for annotating conversations between a user and an electronic assistant in a hierarchical manner are disclosed. An example system includes a data store of hierarchical annotation records. The hierarchical annotation records include root records and non-root records. Each root record has a conversation identifier and an annotation identifier. Each non-root record includes an annotation identifier and a parent identifier, the parent identifier being an annotation identifier of another record. At least some of the non-root records further include an annotation tag. The system generates a first new root record and first non-root records for an input dialog act and generates a second new root record and second non-root records for an output dialog act that is responsive to the input dialog act. At least one of the second non-root records includes an annotation tag linking back to a record of the first non-root records.

19 Claims, 9 Drawing Sheets

Related U.S. Application Data

(60) Provisional application No. 62/403,932, filed on Oct. 4, 2016.

(58) Field of Classification Search
CPC .......... G10L 15/22; G06N 5/00; G01B 21/30; G01B 7/28; G01N 27/24; G06K 9/00402
USPC ............................................................ 704/9
See application file for complete search history.

(56) References Cited

U.S. PATENT DOCUMENTS

| | | |
|---|---|---|
| 2007/0016614 A1 | 1/2007 | Novy |
| 2010/0131274 A1 | 5/2010 | Stent et al. |
| 2014/0297268 A1* | 10/2014 | Govrin .................... G06N 5/04 704/9 |

OTHER PUBLICATIONS

United Kingdom Intellectual Property Office; Office Action issued in Application No. 1715647.2 dated Oct. 29, 2019.
United Kingdom Intellectual Property Office; Combiend Search and Examination Report issued in Application No. 1715647.2 dated Feb. 13, 2018 dated Feb. 13, 2018.
Allan, et al.; "Draft of DAMSL: Dialog Act Markup in Several Layers;" Available at: www.cs.cmu.edu/afs/cs/Web/People/dgroup/papers/manual - 2.1 ps; 32 pages; dated Oct. 18, 1997.
Lemon et al.; Multi-tasking and Collaborative Activities in Dialogue Systems; Center for the Study of Language and Inforamtion; 12 pages; dated Jul. 11, 2002.
European Patent Office—International Searching Authority; International Search Report and the Written Opinion of PCT Serial No. PCT/US2017/053909; dated Dec. 14, 2017.
German Patent Office; Office Action issued in Application No. 10 2017 121 780.0; 16 pages; dated Mar. 29, 2021.
China National Intellectual Property Administration; Notice of Allowance issued in Application No. 201710914486.3; 4 pages; dated Jun. 7, 2021.

* cited by examiner

HIERARCHICAL ANNOTATION OF DIALOG ACTS

CROSS REFERENCE TO RELATED APPLICATIONS

This application is a continuation and claims priority to U.S. application Ser. No. 15/717,355, filed Sep. 27, 2017, which claims priority to U.S. Provisional Application No. 62/403,932, filed Oct. 4, 2016, the disclosures of what are incorporated herein by reference in their entirety.

This application claims priority to, U.S. Provisional Application No. 62/403,932, filed Oct. 4, 2016, the disclosure of which is incorporated herein by reference in its entirety.

BACKGROUND

Computing devices can include an electronic assistant that responds to verbal communications of a user of the computing device in a conversational manner. In such a device, the user may speak something that the electronic assistant responds to, e.g., via synthesized speech using audio output. The response by the electronic assistant may include a question for the user to respond to. Thus, the user and the computing device may engage in a conversation. The conversation can result in the electronic assistant performing a task or may just be interactional (e.g., telling a joke or providing insight).

SUMMARY

Implementations provide a system for annotating conversations between a user and an electronic assistant in a hierarchical manner that can be used to improve the quality of the electronic assistant over time (e.g., by improving ranking signals used in machine learning). Implementations provide a flexible hierarchical structure for describing the conversation and relating dialog acts—both the user's and the electronic assistant's—over the course of the conversation. Each dialog act may be represented as a separate tree in the conversation with annotations modeled as nodes in the tree and arcs connecting nodes in different trees that have an interrelationship. In the hierarchical structure for annotating dialog acts, child nodes identify parent nodes. This enables implementations to store the individual elements as an unordered list and to add annotations and arcs dynamically, i.e., in real time. Some implementations may include post-processing of the annotation records, i.e., an offline mode, to add information to the annotation records not available in an online mode, i.e., when the records in the hierarchical structure are generated. Such information may include the links between responses and requests that cannot be made with information available in real-time.

According to certain aspects of the disclosure, a method may include generating a first annotation tree for an annotated dialog act. The first annotation tree includes a root node for the dialog act and leaf nodes for each non-null annotation tag for the dialog act. The dialog act is associated with a conversation identifier. The leaf nodes of the first annotation tree including a previous discourse node corresponding to a previous discourse tag in the annotated dialog act. The method also includes generating an annotation identifier for each node in the first annotation tree, the annotation identifiers being unique within the conversation identifier. The method can also include writing an annotation record for each node. In the annotation records, a record for the root node lacks a parent identifier; a record for non-root nodes include a parent identifier, the parent identifier referencing the annotation identifier of the parent; and the record for the previous discourse node including an annotation identifier for a corresponding subsequent discourse node, the subsequent discourse node being a leaf node in a second annotation tree also associated with the conversation identifier.

Generating the annotation tree for the annotated dialog act may include: determining that a first subordinate dialog act and a second subordinate dialog act share a common tag and a common parent; and inserting a node in the annotation tree that is a child of a node for the common parent and is a parent of a node for the first subordinate dialog act, of a node for the second subordinate dialog act, and of a node for the common tag, wherein the node for the first subordinate dialog act and the node for the second subordinate dialog act each lack a child node corresponding to the common tag. The method may further comprise accessing the annotation records in response to a query and returning annotation records determined to be responsive to the query. The method may further comprise accessing the annotation records to generate training examples for a dialog management engine; and training the dialog management engine using the training examples. The method may further comprise accessing the annotation records to identify failure patterns. The annotation record for each node may include text corresponding to the node. The annotation records may be stored in an unordered list. The first annotation tree may represent a first turn in the conversation and the second annotation tree may represent a second turn in the conversation, the first turn and the second turn may be separated by at least one intervening turn. The record for the root node may include an indication of a speaker for the dialog act. The record for the root node and at least some of the plurality of non-root records may further include an indication of a speaker for the dialog act. The annotation tag may be selected from the group including a subsequent discourse tag, a dialog act type, and a previous discourse tag. The annotation tag may be selected from the group including a subsequent discourse tag, a dialog act type, a dialog error type and a previous discourse tag. Non-root records having an annotation tag that represents a previous discourse tag may further include an annotation identifier of another annotation record, the other record having an annotation tag that represents a subsequent discourse tag. At least some of the non-root records further include an annotation tag. At least some of the annotation tags may represent a text span. At least one of the dialog acts may represent an operational action performed by a user. The method may further comprise receiving input dialog acts from a dialog input device and receiving output dialog acts for output via a dialog output device.

According to certain aspects of the disclosure, a system comprising: at least one processor; a dialog input device; a dialog output device; and memory storing instructions that, when executed by the at least one processor performs operations including: receiving input dialog acts from the dialog input device and receiving output dialog acts for output via the dialog output device, and generating hierarchical annotation records for annotations of the input dialog acts and for annotations of the output dialog acts, wherein the hierarchical annotation records for a dialog act include: a root record specifying a conversation identifier and an annotation identifier, a plurality of non-root records including: an annotation identifier, and a parent identifier, the parent identifier being an annotation identifier of another record, wherein at least some of the non-root records further include an annotation tag.

The root record may further include an indication of a speaker for the dialog act. The root record and at least some of the plurality of non-root records may further include an indication of a speaker for the dialog act. The annotation tag may be selected from the group including a subsequent discourse tag, a dialog act type, and a previous discourse tag. The annotation tag may be selected from the group including a subsequent discourse tag, a dialog act type, a dialog error, and a previous discourse tag. The non-root records may have an annotation tag that represents a previous discourse tag further include an annotation identifier of another annotation record, the other record having an annotation tag that represents a subsequent discourse tag. At least some of the annotation tags may represent a text span. At least one of the dialog acts may represent an operational action performed by a user of the system. The operations may also comprise determining that a first non-root record associated with a root record for a first conversation identifier links to a second non-root record associated with a root record for a second conversation identifier, generating a first new non-root record identifying the second non-root record in the parent identifier and having an annotation tag that represents a subsequent discourse, and generating a second new non-root record identifying the first non-root record in the parent identifier, having an annotation tag that represents a previous discourse and identifying the annotation identifier for the first new non-root record, wherein the first conversation identifier and the second conversation identifiers are not sequential.

According to certain aspects of the disclosure, a system includes at least one processor, a dialog input device, a dialog output device, and a data store of hierarchical annotation records. The hierarchical annotation records include root records and non-root records. Each root record specifies a conversation identifier and an annotation identifier. Each non-root record includes an annotation identifier and a parent identifier, the parent identifier being an annotation identifier of another record. At least some of the non-root records further include an annotation tag. The system also includes memory storing instructions that, when executed by the at least one processor performs operations. The operations may include receiving an input dialog act from the dialog input device, generating a first new root record and first non-root records for the input dialog act, receiving an output dialog act for output via the dialog output device that is responsive to the input dialog act, and generating a second new root record and second non-root records for the output dialog act, at least one of the second non-root records including an annotation tag linking back to a record of the first non-root records. Linking back to a record of the first non-root records may include generating the record with a subsequent discourse tag, the record having a parent identifier of an existing first non-root record. The annotation tag may be selected from the group including a subsequent discourse tag, a dialog act type, and a previous discourse tag. At least some of the first non-root nodes may include a tag that represents a text span of the input dialog act.

In one general aspect, a computer program product embodied on a computer-readable storage device includes instructions that, when executed by at least one processor formed in a substrate, cause a computing device to perform any of the disclosed methods, operations, or processes. In another general aspect, a system comprising at least one processor and a memory storing instructions that, when executed by the at least one processor performs operations in accordance with the methods, operations or processes as disclosed above. Another general aspect includes a system and/or a method for annotating dialog acts, substantially as shown in and/or described in connection with at least one of the figures, and as set forth more completely in the claims.

One or more of the implementations of the subject matter described herein can be implemented so as to realize one or more of the following advantages. For example, because the annotation structure includes parent identifiers rather than children, additional annotations can be added in real time and the dialog acts can be stored in an unordered list. The additional annotations can link a conversation that occurs over a long period, e.g., days. Because the list is unordered, annotations can be added by multiple calls to a dialog manager, making the structure flexible. The structure also aids querying over annotation tags because the system captures interrelations between the system and user in a highly structured way. Thus, for example, the annotation records can be queried for all questions answered with a "yes/no" answer in which the user also expressed a verbal sigh (which may be captured in an annotation tag) and, using the parent links, the dialog acts relating to these answers can be quickly identified and returned. As another example, a query may use the records to identify all abandoned conversations, e.g., a subsequent discourse tag that does not have a previous discourse tag. These conversations may be provided to a model that identifies a pattern to the conversations. The pattern may be provided to developers so to identify areas where the dialog acts of the electronic assistant can be improved.

As another example, the hierarchical structure provides a smaller memory footprint by avoiding duplication of annotations. For example, an annotation that applies to multiple children in the tree can be stored once at the common parent rather than at each node. As another example, the hierarchical annotation records are theoretically sound and semantically correct. This allows implementations to be robust to any kind of dialog as opposed to being scoped to system-driven dialogs. In other words, the hierarchical annotation records disclosed herein, which attach machine-readable semantics to dialog acts, enable high-precision processing of conversations. For example, the hierarchical structure enables the system to pinpoint parts of the dialog act that correspond to specific annotations. Thus, for example, different parts of a complex, compound dialog act can be precisely annotated. This precision extends to the ability to identify previous annotations a part of the dialog act is related to. Moreover, the annotations can be freely defined. In other words, while the system supports annotations based on theoretical definitions, it can also support annotations generated by a specific dialog manager, making them flexible and customizable, which supports flexible querying and training. As another example, the hierarchical annotation schema also allows various annotations to be linked backwards, which enables easier post-processing and data collection. This contrasts with dialog metric tracking done on a turn-by-turn basis, with the assumption that a dialog acts are sequential, e.g., a dialog act on the N+1 turn is directly related to the dialog action the N turn. The unordered list nature of disclosed implementations allows a dialog act on the NA turn to be linked to any turn <N (e.g. not sequential). This enables generation of quantitative metrics for concepts such as "which previous interaction is the current user's dialog act referring to?" and "how long ago was that reference?" in real time as well as to analyze forward references in retrospect, e.g., identifying for some historical dialog act subsequent dialog acts that referred to the historical act in whole or in part. Such forward references are possible due to the unordered list nature of disclosed implementations.

As another example, implementations offer a high level of precision, which is important for measuring quality correctly. It will also be appreciated that improved device performance is a facet of the above description. For example, the hierarchical organization of annotations for dialog makes the dialog searchable, e.g., via a search query over the tree, and reduces the need to search large corpuses of dialog for such annotations. Hierarchical annotation of dialog acts also provides a contextual framework for those annotations that would not otherwise be possible for the device processor to develop. This reduces demands on computation resources, memory usage, and battery use in a client or local device. In cases where a device is operated in client-server mode, this also reduces the client server communication demand and data usage.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
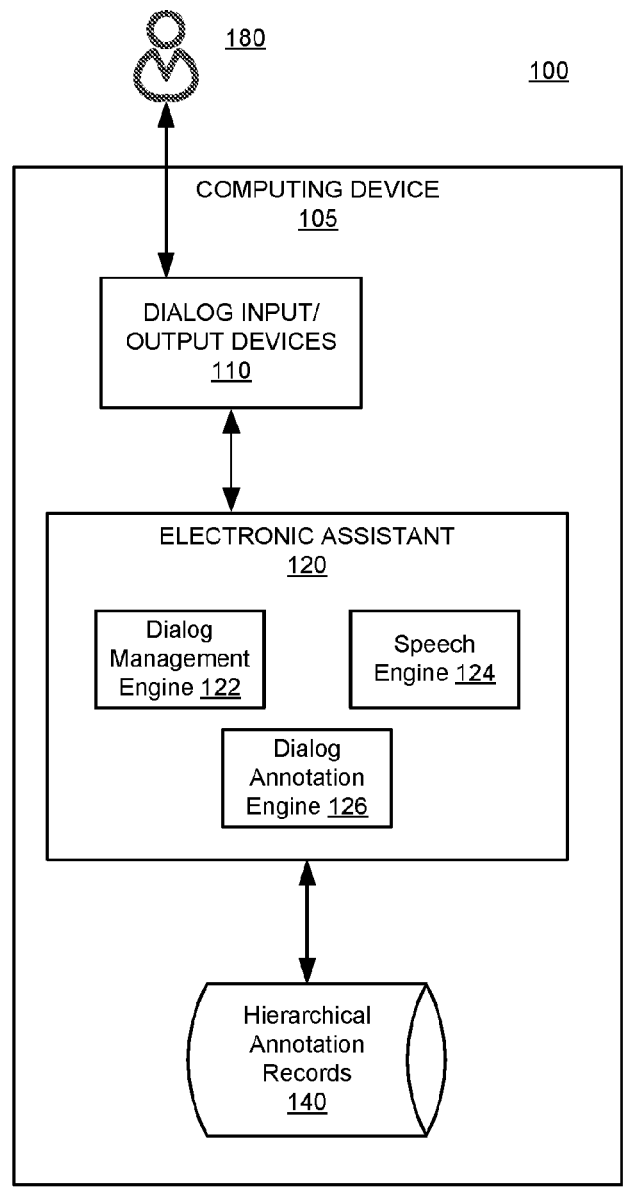
FIG. 1 is a block diagram illustrating an example system in accordance with the disclosed subject matter.

Implementations include systems and methods that generate hierarchical annotations for dialog acts in a conversation between a user and an electronic assistant that facilitates searching and improvement of the quality aspects of the electronic assistant, such as ranking, determining bottlenecks, and determining what dialog acts provided by the system cause the user to terminate the conversation, e.g., to bail out because of frustration. FIG. 1 is a block diagram of a conversational hierarchical annotation system in accordance with an example implementation. The system 100 may be used to generate annotation records in a flexible hierarchical schema. The depiction of system 100 in FIG. 1 is a single computing device but implementations may also move some of the components to a server, making system 100 a client-server system, as illustrated in more detail in FIG. 2. In addition one or more components may be combined into a single module or engine, and some capabilities of the illustrated components may be performed by separate engines. In some implementations, a user of the computing device may indicate that portions of the processing be performed at a server. The user may also control whether the hierarchical annotation records are stored and where such storage occurs. Thus, implementations are not limited to the exact configurations illustrated.

Figure 7:
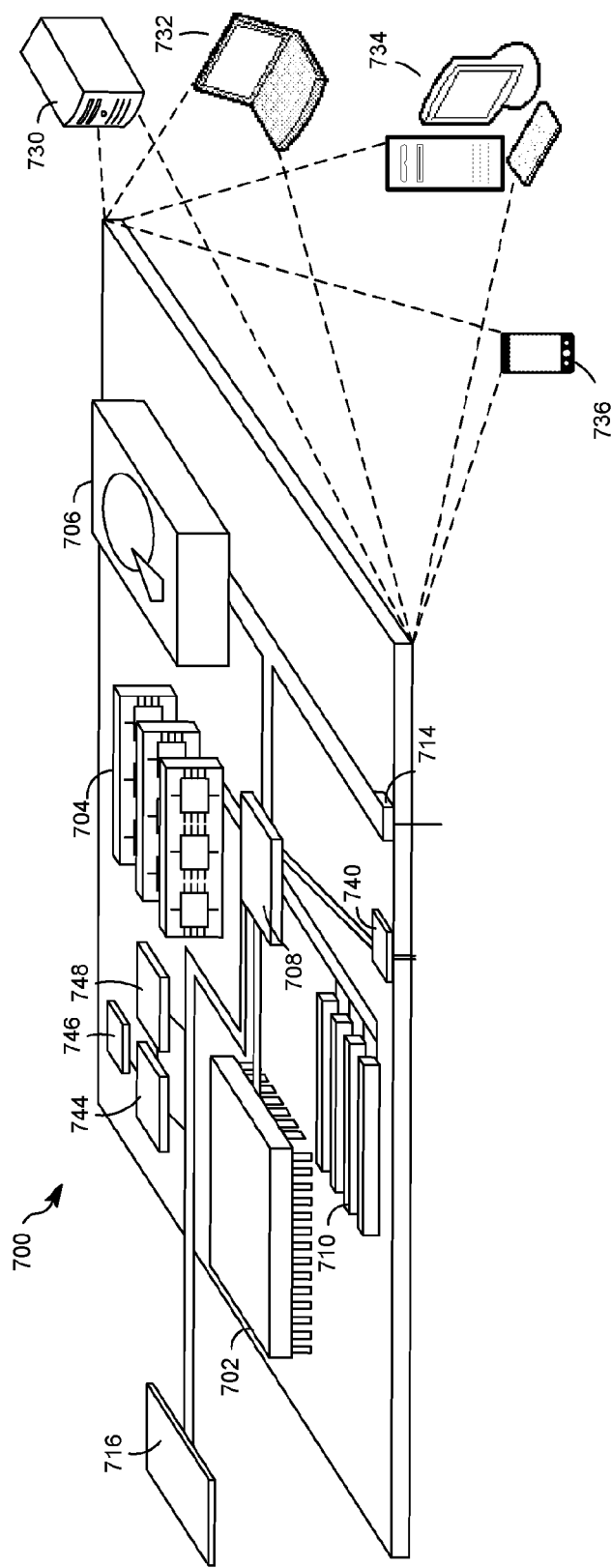
FIG. 7 shows an example of a computer device that can be used to implement the described techniques.

The hierarchical annotation system 100 includes a computing device 105. The computing device may be implemented in a personal computer, for example a laptop computer, a smartphone, a tablet, a desktop computer, a wearable device, a home appliance, etc. The computing device 105 may be an example of computer device 700, as depicted in FIG. 7. The computing device 105 may include one or more processors formed in a substrate (not illustrated) configured to execute one or more machine executable instructions or pieces of software, firmware, or a combination thereof. The processors can be semiconductor-based—that is, the processors can include semiconductor material that can perform digital logic. The computing device 105 can also include one or more computer memories. The memories, for example, a main memory, may be configured to store one or more pieces of data, either temporarily, permanently, semi-permanently, or a combination thereof. The memories may include any type of storage device that stores information in a format that can be read and/or executed by the one or more processors. The memories may include volatile memory, non-volatile memory, or a combination thereof, and store modules or engines that, when executed by the one or more processors, perform certain operations. In some implementations, the modules may be stored in an external storage device and loaded into the memory of computing device 105.

The computing device 105 may include dialog input-output device(s) 110. The dialog input/output devices 110 may include hardware that enables the electronic assistant 120 to receive input from the user 180 or provide a response to the user 180. Input from the user may be vocal, e.g., in the form of speech. Input from the user may also be non-vocal, e.g., text provided by the user. The output can, similarly, be speech-based or text-based. Common dialog input/output devices include a microphone and speaker and/or a keyboard (virtual or physical) and a display. The hierarchical annotation system 100 is discussed primarily in the context of a spoken conversation using a microphone and speaker but implementations include other conversational modes, such as those held in a messaging application.

The modules of the hierarchical annotation system 100 may include an electronic assistant 120. The electronic assistant 120 may be configured to obtain input from the dialog input/output devices 110, to process the input, and to provide a response to the dialog input/output devices 110. The electronic assistant 120 may include a dialog management engine 122, a speech engine 124, and a dialog annotation engine 126. The speech engine 124 can use a suitable speech-to-text process to convert received vocal inputs into a text string. A non-vocal input received as text may also be passed to the speech engine 124 (e.g., via typing other text selection). In some implementations, the non-vocal input may be text recognized in an image. For example, a user 180 may take a photograph using a camera (not illustrated) communicatively connected to the computing device 105 and the image may be provided to the speech engine 124. For example, the speech engine 124 may perform recognition on the image to discover text to be used as input. In some implementations, the non-vocal input may be an entity recognized in the image. For example, the speech engine 124 may perform entity recognition on the image to determine an entity from a knowledge base included in the image and use a description of the entity as text input. The input, whether vocal or non-vocal, is referred to as a dialog act. A dialog act includes vocal input, non-vocal input, or a combination of vocal and non-vocal input. A dialog act can also include operational actions performed by a user. For example, pressing a power-off button may be a dialog act. An output provided by the electronic assistant 120 is also a dialog act. The speech engine 124 may convert the output dialog act to a sound file that can be played by the input/output devices 110 or may provide text of the dialog act for display on input/output devices 110.

The dialog management engine 122 may manage one or more dialogs. This includes maintaining a state of the dialog, e.g., what question is being answered, so that the electronic assistant 120 can properly interpret received audio associated with the dialog. In particular, the accuracy of the electronic assistant 120 in correctly interpreting the received audio can be improved by knowing what type of response is requested by the user 180. For example, the dialog management engine 122 may determine that the user has requested a task to be performed. The dialog management engine 122 may also include a machine-learning algorithm capable of conversing with the user, e.g., by generating a conversational response that does not respond to a specific task. Dialog management engine 122 can use conventional or later developed techniques to generate a response to the user. As indicated above, the response is also considered a dialog act.

Whether a dialog act is from the user 180 or from the dialog management engine 122, the electronic assistant 120 annotates the dialog act to mark important characteristics of the dialog act, such as whether the dialog act is a request, a statement, an answer to a request, not comprehendible, etc. One example of a system for annotating dialogs is DAMSL (Dialog Act Markup in Several Layers). The following represents two dialog acts from a sample dialog between a user and an electronic assistant:
[user] How are you today?
[ea] Fine. I am well. How are you?
The electronic assistant 120 may annotate the dialog acts as follows:
U:[How are you today?]
   DAE:< >
   DAT: TASK
   SD: INFO_REQUEST
   PD: < >
EA: [Fine. I am well. How are you?]
   EA:[Fine]
   DAE:< >
   DAT:TASK
   SD:STATEMENT_ASSERT
   PD:ANSWER
   EA: [I am well.]
   DAE:< >
   DAT:TASK
   SD:STATEMENT REASSERT
   PD:ANSWER
   EA: [How are you?]
   DAE:< >
   DAT:TASK
   SD:INFO_REQUEST
   PD:< >

In the annotation example above, DAE represents a DialogActError tag that records error information, such as whether the dialog act is intelligible and whether the dialog act was successfully completed. DAT represents a DialogActType tag that characterizes the semantic content of the dialog act. SD is a SubsequentDiscourse tag that captures the effect the dialog act may have on subsequent interactions and/or constrains the future beliefs and actions of the participants. PD is a PreviousDiscourse tag that is an indication of how the current dialog act relates to previous discourse. In the annotation above, each dialog act (also referred to as an utterance, although the dialog act is not limited to vocal inputs and may include typewritten or recognition inputs as described above), may be divided into one or more subordinate dialog acts (e.g., sub-utterance) based on the characteristics of different portions of the dialog act. Thus, for example, the electronic assistant's response is divided into three subordinate dialog acts. The first is an assertive statement, the second is a reasserted statement, and the third is an information request.

Implementations can use any annotation scheme and is not limited to the use of the annotation tags or annotation scheme illustrated. For example, implementations may include internal information about how the system generated a response for the electronic assistant. Implementations may also include annotations that represent links to external resources that were used when interpreting the user input or when generating the system response. Annotations may include attributes about the environment, e.g., whether it was noisy or quiet, whether the input was vocal or non-vocal, etc. Annotations can be any tag and value pair mapped to all or a portion of the dialog act. Annotations (the tag and its possible values) can be unique to, and defined by, a particular dialog manager within the electronic assistant 120. In some implementations, different dialog managers operating with the electronic assistant 120 may define different annotations.

The electronic assistant 120 may include a dialog annotation engine 126, which may use the annotations to generate a hierarchical representation that can be stored in a machine-readable form as hierarchical annotation records 140. This hierarchical representation can be used to derive insights for the electronic assistant 120 to improve the quality of the dialog acts provided by the electronic assistant 120 over time. The operation of the dialog annotation engine 126 may be controlled by the user 180. For example, the dialog annotation engine 126 may operate only with permission of the user. The hierarchical annotation records 140 generated with the user's permission can be used to train the dialog management engine 122, creating a personalized engine that is specific to the user and recognizes his or her way of interacting with the electronic assistant. Such personalized training of the dialog management engine 122 provides higher quality responses from the electronic assistant 120. For example, the hierarchical annotation records 140 can be used to identify dialogs where users frequently ask multiple clarifying questions before advancing. Identifying such "hot spots" can lead to improving the prompt of the electronic assistant, so that the clarifying questions are not needed. In some implementations, annotated dialog records may be provided to a machine learning algorithm trained to identify such 'hot spots' and suggest or generate an appropriate fix to the prompt. In some implementations, a machine-learning algorithm may be used to identify forward references, e.g., for a particular dialog act, one or more subsequent dialog acts that refer back to the particular dialog act in whole or in part. The system 100 may also aggregate hierarchical annotation records 140 across many users to drive general purpose quality improvements. The system 100 may also use the hierarchical annotation records 140 to create a more helpful graphical user interface that indicates to the user that part of the system response is intending to refer back to a previous dialog act, even if it was not immediately preceding the response.

Figure 3:
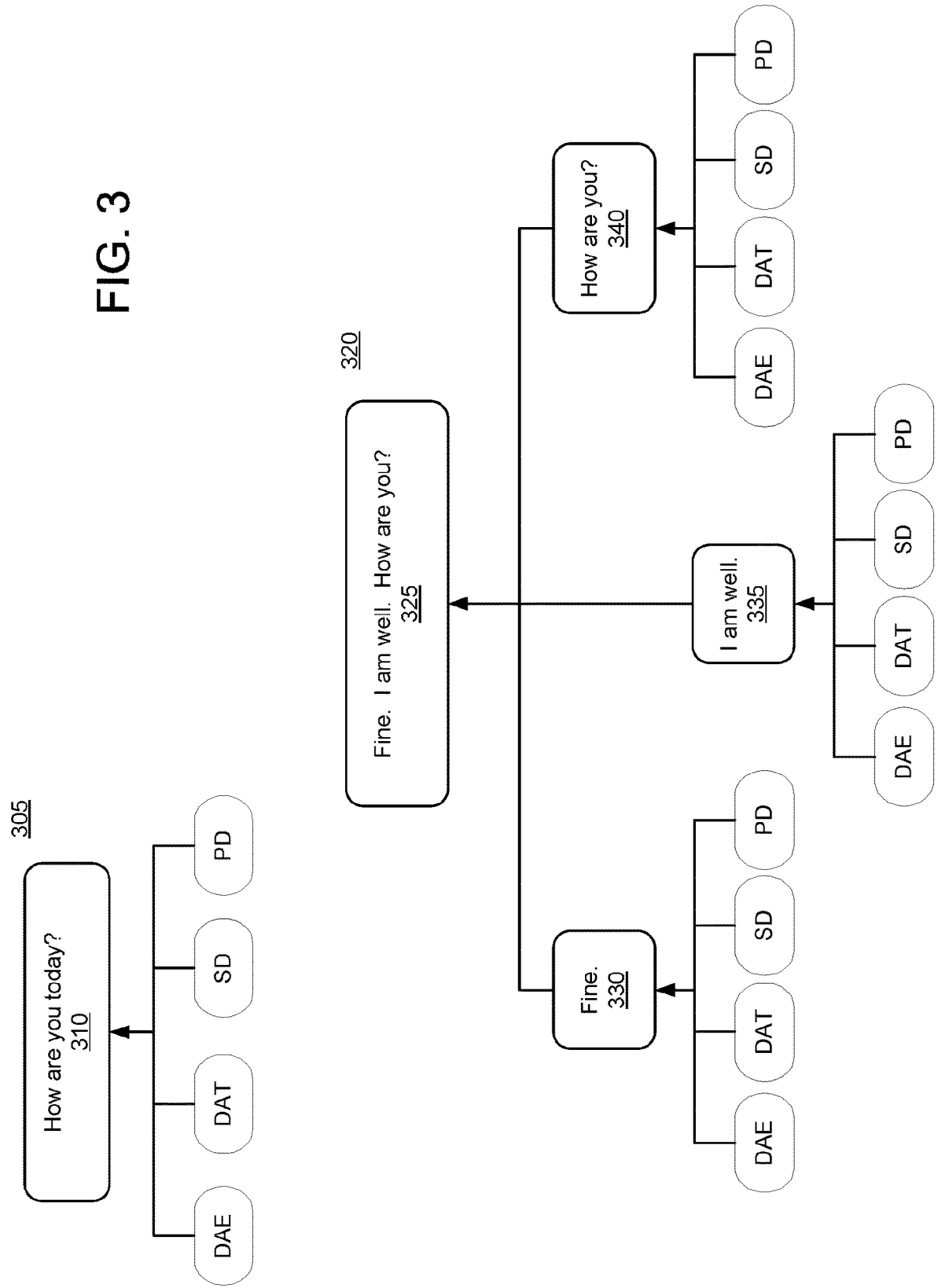
FIG. 3 is a block diagram illustrating an example of initial annotation trees for two dialog acts in a conversation, in accordance with the disclosed subject matter.

To generate the hierarchical annotation records 140, the dialog annotation engine 126 may start with the annotated utterance and generate a node for each utterance, each sub-utterance, and each annotation flag. This generates a tree-based structure for the utterance. FIG. 3 illustrates a block diagram of an example annotation tree 305 of the example user utterance and an annotation tree 320 for the electronic assistant utterance disclosed above. In the example of FIG. 3, all annotation tags are listed as leaf nodes of the utterance or sub-utterance they apply to. The dialog annotation engine 126 may prune any leaf nodes corresponding to null annotation tags. In the example of FIG. 3, all DAE annotation tags are empty and their corresponding nodes would be removed, or would never be generated. Likewise, the previous discourse tags (PD) that are associated with utterance node 310 and sub-utterance node 340 are null and would be pruned. In addition, the dialog annotation engine 126 may move any leaf nodes for annotation tags that are common to all children to the parent. Because the DAT tag for sub-utterance nodes 330, 335, and 340 applies to each child, the dialog annotation engine 126 may move the leaf node up a level to the parent utterance node 325. In some implementations, the dialog annotation engine 126 may generate a sub-utterance when some but not all children have an annotation flag in common. For example, sub-utterance node 330 and sub-utterance node 335 both share a previous discourse tag that refers back to the same inquiry node. In some implementations, the dialog annotation engine 126 may add a level to the tree, making node 330 and node 335 the children on a common parent sub-utterance node, which is a child of node 325. The common tag, PD, may become a leaf node of the common parent node. The finalized annotation trees 305 and 320 are illustrated in FIG. 4.

Figure 4:
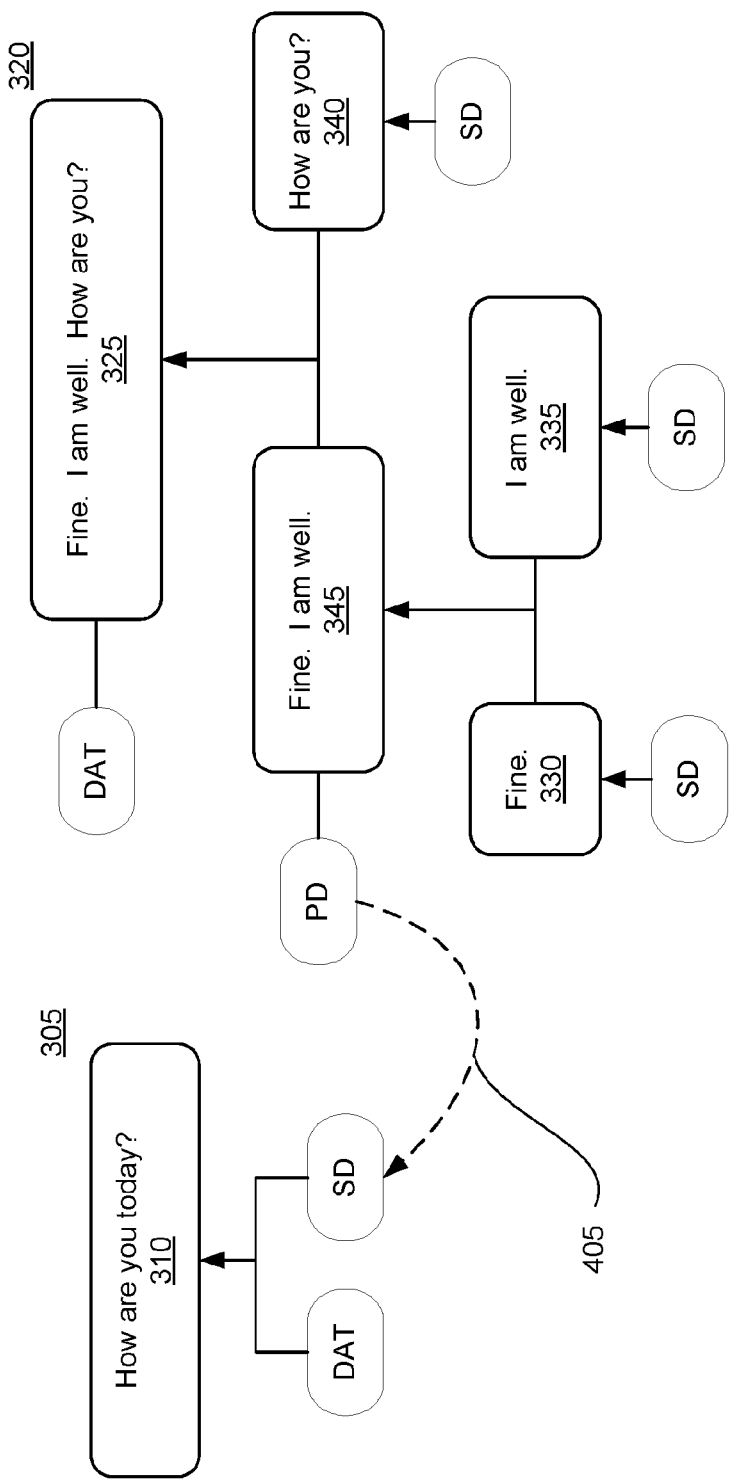
FIG. 4 is a block diagram illustrating an example of final annotation trees for the dialog acts of FIG. 3 in accordance with the disclosed subject matter.

As illustrated in FIG. 4, the parent node 325 of tree 320 has a DAT tag node as a leaf node, which means it applies to all sub-utterance nodes for the parent. The sub-utterance node 345 has been inserted and is the parent of sub-utterance nodes 330 and 335. The leaf node for the previous discourse tag is associated with the sub-utterance node 345, so it applies to both sub-utterance node 330 and sub-utterance node 335. All leaf nodes corresponding to null or empty tags have been removed. In addition, the dialog annotation engine 126 has added a link 405 from the previous discourse node to the subsequent discourse node that it corresponds to. Thus, the dialog annotation engine 126 has linked the two trees in the context of the conversation. Of course, if the sub-utterance 335 did not correspond to the same subsequent discourse node as sub-utterance 330, node 345 would not be generated and node 330 and node 335 would keep their respective PD nodes. In this example, the dialog annotation engine 126 adds a second link, which links the PD node of the sub-utterance node 335 to its corresponding SD node. As the annotation trees of FIGS. 3 and 4 illustrate, the arrows point upwards, from the children to the parent. This reference to the parent allows the annotations to be preserved as an unordered list. This is done to support the ability for annotations to be added in real time and to support the ability to point to other annotations, e.g., link 405. If each node included a reference to the children, these features would not be available. The root of an annotation tree is a node without a parent.

Figure 5:
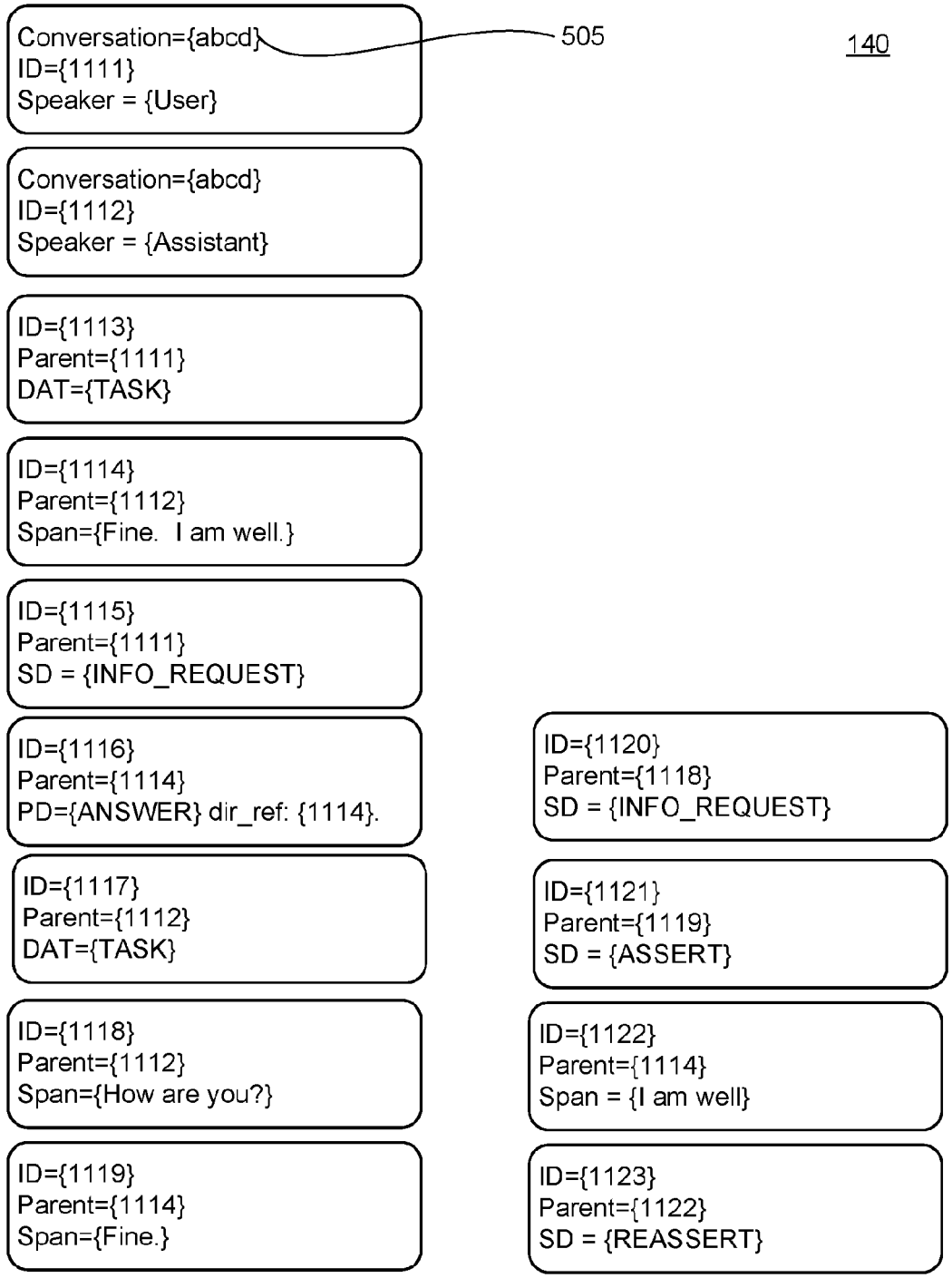
FIG. 5 is a block diagram illustrating example hierarchical annotation records generated from the final tree-based annotation of FIG. 4 in accordance with the disclosed subject matter.

The dialog annotation engine 126 may use the annotation trees to generate an unordered list of annotation records. FIG. 5 is a block diagram illustrating example hierarchical annotation records generated from the final tree-based annotation of FIG. 4 in accordance with the disclosed subject matter. The hierarchical annotation records of FIG. 5 are examples of hierarchical annotation records 140 of FIG. 1 and FIG. 2. Each record may have different attributes depending on its function in the tree. In some implementations, the records representing the root node (e.g., ID={1111} and ID={1112}) of an annotation tree may include a conversation identifier 505. The conversation identifier may be generated by the electronic assistant 120 at the start of the conversation. This identifier may be used for the lifetime of the conversation. A conversation may be defined differently by different electronic assistants and can be context based. The dialog annotation engine 126 uses the conversation identifier provided by the electronic assistant 120. The dialog annotation engine 126 logs the conversation identifier once for each turn. Thus, the conversation identifier can be included in the root node of the annotation tree because the annotation tree represents one turn in the conversation. The conversation identifier could also be stored in each annotation record, although this uses additional memory resources but could speed some queries. In some implementations, the conversation identifier is not included in any annotation records Each root node may also include an indication of the speaker. Each tree represents a turn, or dialog act, taken by one of the speakers in the conversation. To conserve memory, the speaker identifier may be included only in the root node, which represents the entire dialog act, although in some implementations the speaker can be identified in subordinate acts as well. Including the speaker in each node uses more memory resources but can result in improved query processing speed. Whether to include the speaker or other characteristics common in each node rather than in the parent node is a tradeoff between memory usage and query speed. Each node in the annotation tree (e.g., utterance, sub-utterance, or tag) also receives a unique identifier, which need only be unique within the conversation. Thus, each annotation record has an ID unique to the record. This identifier is generated in real-time, e.g., as the conversation is ongoing, and is referred to as the annotation identifier. Records for nodes that are not the root node each has a parent identifier, which includes the annotation identifier of the parent node. Finally, each record that is not a root node includes attributes that identify the node. For example, the record with annotation identifier 1113 indicates the node is for a DAT tag and includes the value of the DAT tag. Likewise, the record with annotation identifier 1116 indicates the node is for a previous discourse (PD) tag and includes the value for that tag. In addition, the node includes the annotation identifier of the subsequent discourse node that corresponds to the previous discourse tag. In other words, the link 405 of FIG. 4 between the response (PD) and the request (SD) is recorded in the PD node as the annotation identifier of the corresponding SD node. In this manner the dialog annotation engine 126 creates a structure that links the annotation trees and provides context for the conversation. This context can help the electronic assistant learn how to better respond to the user. For example if a user responds to a question by the electronic assistant with a question, this may be an indication that the question was unclear. This knowledge can be used to change the dialog flow in future dialogs. In some implementations, the text span corresponding to a dialog act node or a subordinate dialog act node may be included in the annotation record. Such inclusion is optional. As illustrated in FIG. 5, no order in the annotation records is assumed. In other words, the annotation records are an unordered list. The inclusion of the parent identifier is what makes the hierarchical structure discoverable. The annotation records may include additional information not illustrated in FIG. 5. For example, a particular dialog manager may include information in one or more of the dialog act or subordinate dialog act nodes as part of an extension to the annotation schema. Thus the structure is customizable for various dialog tasks.

Returning to FIG. 1, the dialog annotation engine may store the annotation records, e.g., the records illustrated in FIG. 5, to a data storage device, such as hierarchical annotation records 140. The hierarchical annotation records may then be available for querying or training of models for the electronic assistant 120.

Figure 2:
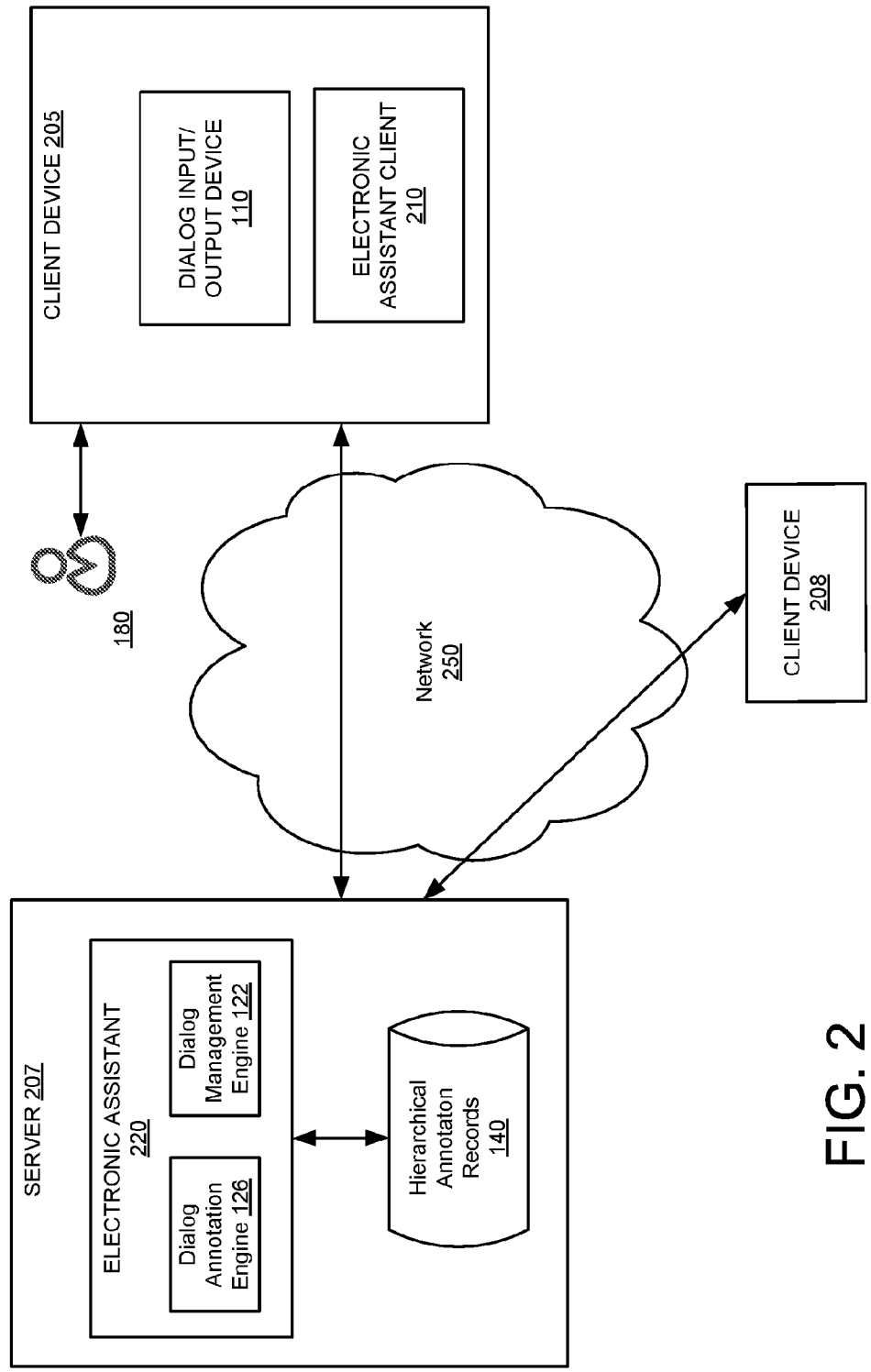
FIG. 2 is a block diagram illustrating another example system in accordance with the disclosed subject matter.

FIG. 2 is a block diagram illustrating another example system in accordance with the disclosed subject matter. In the example of FIG. 2 some of the functionality described above with regard to FIG. 1 is performed by a server rather than on the computing device. The example hierarchical annotation system 100 of FIG. 2 includes a client device 205 and a server 207. The client device 205 is similar to the computing device 105 of FIG. 1 but includes an electronic assistant client 210 rather than the fully-functional electronic assistant 120. The electronic assistant client 210 can include some of the functionality of the electronic assistant 120, for example a speech engine 124 that converts audio input from the user 180 to text. The electronic assistant client 210 may provide the input from the user to the server 207 via a network, such as network 250. Network 250 may be for example, the Internet, or the network 250 can be a wired or wireless local area network (LAN), wide area network (WAN), etc., implemented using, for example, gateway devices, bridges, switches, and/or so forth. Network 250 may also represent a cellular communications network. Via the network 250, the server 207 may communicate with and transmit data to/from client devices 205 and 208, and client device 205 may communicate with other client devices 208 (not shown). Client device 208 may include components similar to those described in regards to client device 205.

Figure 8:
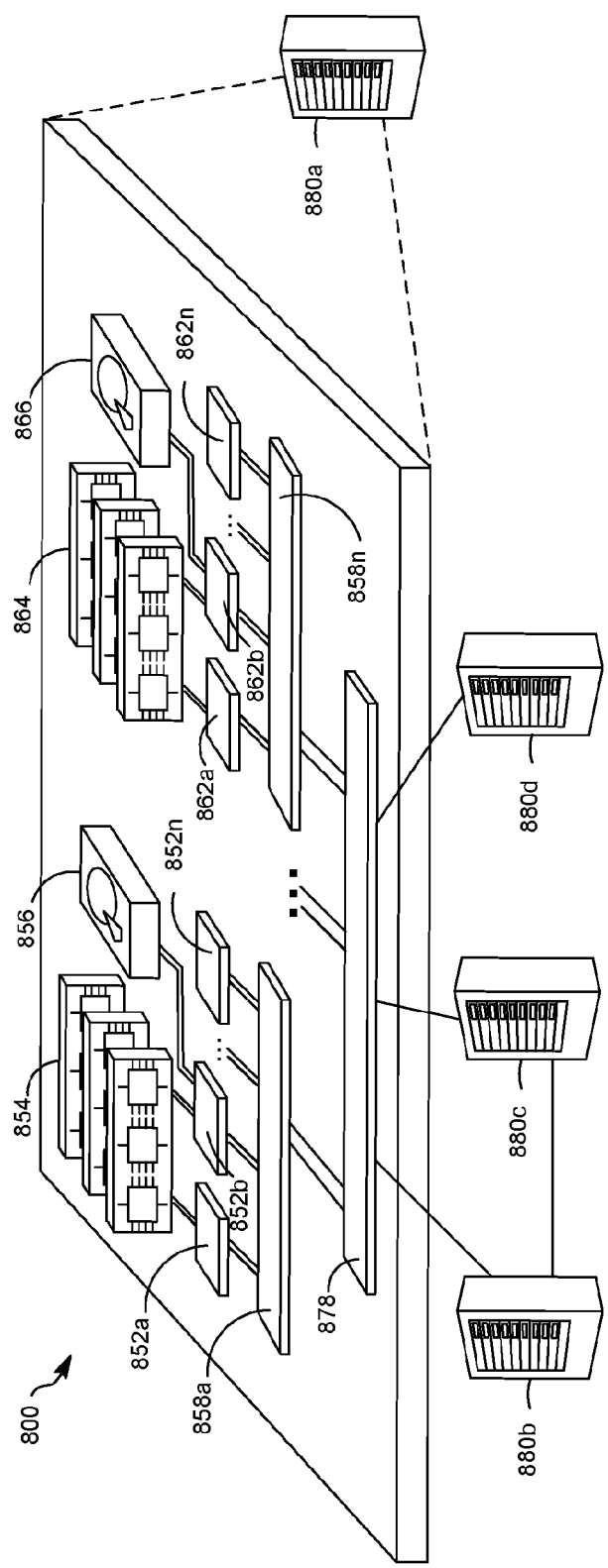
FIG. 8 shows an example of a distributed computer device that can be used to implement the described techniques.

The server 207 may be a computing device or devices that take the form of a number of different devices, for example a standard server, a group of such servers, or a rack server system. For example, server 207 may be implemented in a distributed manner across multiple computing devices. In addition, server 207 may be implemented in a personal computer, for example a laptop computer. The server 207 may be an example of computer device 700, as depicted in FIG. 7, or system 800, as depicted in FIG. 8.

The server 207 may include an electronic assistant 220 that includes at least some of the functionality of the electronic assistant 120 of FIG. 1. For example the electronic assistant 220 may include the dialog annotation engine 126 and the dialog management engine 122. In addition, the server 207 may store the hierarchical annotation records 140. The server 207 may be in communication with multiple client devices, e.g., client device 205 and client device 208, via the network 250.

The hierarchical annotation system 100 represents one example configuration and implementations may incorporate other configurations. For example, some implementations may combine one or more of the components of the dialog annotation engine 126, the dialog management engine 122, and the speech engine 124 a single module or engine. Furthermore, one or more of the components of the electronic assistant 220, the dialog annotation engine 126, the dialog management engine 122, the speech engine 124, and/or the electronic assistant client 210 may be combined into a single engine. In addition, the hierarchical annotation records may be distributed across multiple computing devices, or may be stored at the client device 205. Thus implementations are not limited to the exact configurations illustrated.

To the extent that the hierarchical annotation system 100 collects and stores user-specific data or may make use of personal information, the users may be provided with an opportunity to control whether programs or features collect the user information or to control whether and/or how to receive content that may be more relevant to the user. In addition, certain data may be treated in one or more ways before it is stored or used, so that personally identifiable information is removed. For example, search records may be treated so that no personally identifiable information can be determined and/or a user's geographic location may be generalized where location information is obtained (such as to a city, ZIP code, or state level), so that a particular location of a user cannot be determined. Thus, the user may have control over how information is collected about the user and used by a hierarchical annotation system 100.

Figure 6:
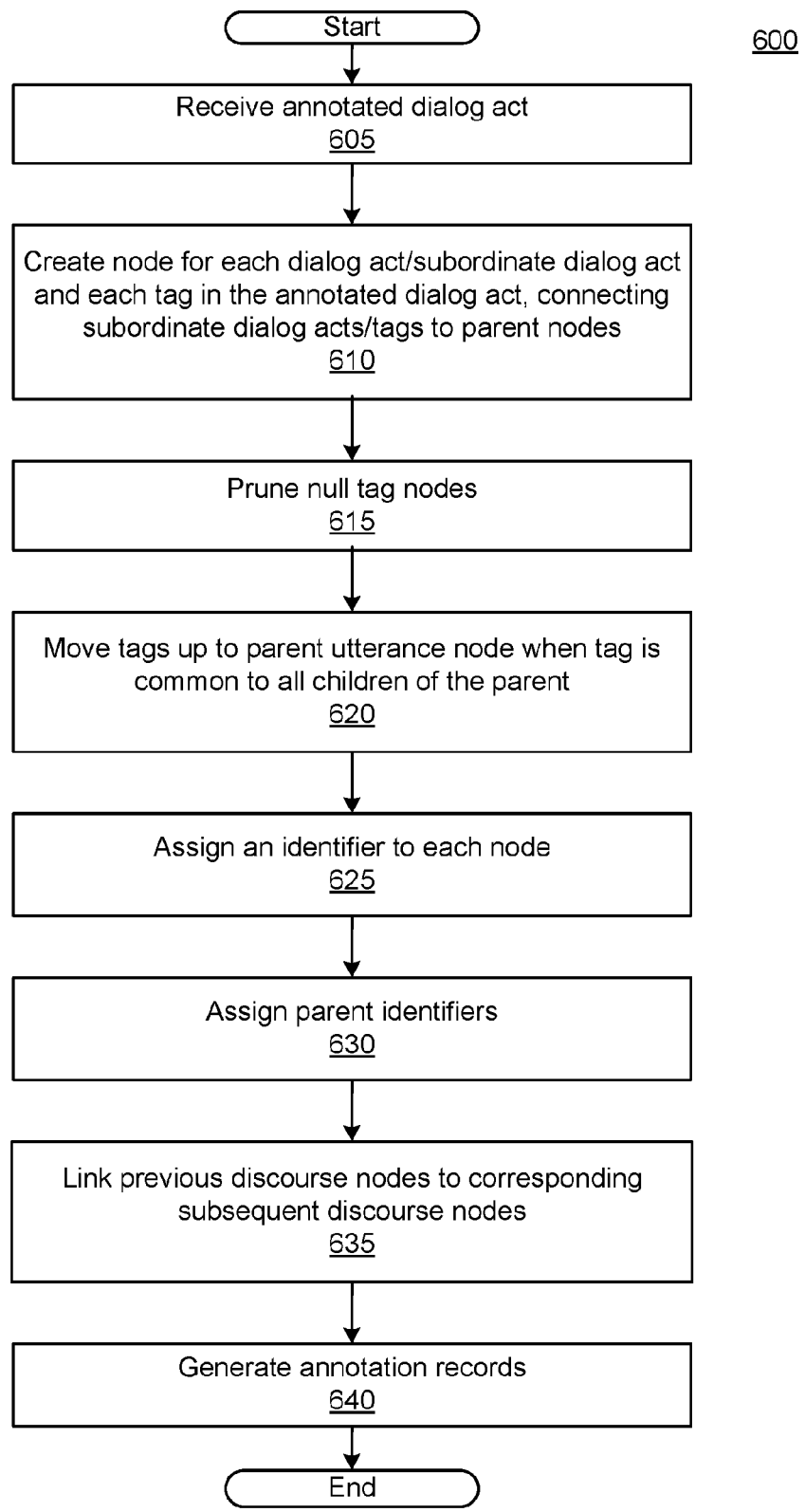
FIG. 6 illustrates a flow diagram of an example process for generating records in a hierarchical annotation structure of conversational dialog acts, in accordance with disclosed implementations.

FIG. 6 illustrates a flow diagram of an example process 600 for generating records in a hierarchical annotation structure of conversational dialog acts, in accordance with disclosed implementations. Process 600 may be performed by a hierarchical annotation system, such as system 100 of FIG. 1 or system 200 of FIG. 2. Process 600 may be used to generate hierarchical annotation records for a dialog, which can be easily searched and used to improve the quality of an electronic assistant that engages with the user in a conversation. The order of the steps in process 600 is exemplary and the order can be re-arranged, some steps may be combined, and some steps may be optional.

Process 600 may begin with an annotated dialog act (605). The dialog act represents a turn taken by one speaker who is party to a conversation. The dialog act can originate from a user or from an electronic assistant. The annotation includes tags that characterize all or part of the dialog act. In one implementation, the annotation is similar to the DAMSL dialog annotation protocol. The system may create a node in an annotation tree for each dialog act and for each subordinate dialog act, connecting the subordinate dialog act to its parent (610). Each root node may be given a conversation identifier, which identifies the conversation the dialog act belongs to. The system may also generate a leaf node for some or all of the annotation tags. The annotation tag nodes point to the dialog act or subordinate dialog act to which they apply. The system, if it generated nodes for null tags may prune those tags from the annotation tree (615). Null tags typically convey no useful information and need not be tracked. The system may identify leaf nodes for annotation tags that apply to more than one subordinate dialog act node and may move the leaf node from the children to the parent (620), thereby reducing the number of leaf nodes. For example, when every subordinate dialog act has a node that represents the same tag and the same value for the tag, the system may remove the node for the tag from each child node and generate a respective node that is dependent on the parent node. Thus, for example, the DAT node of each of the subordinate dialog act nodes 330, 335, and 340 of FIG. 3 is removed and a DAT node is made the leaf of dialog act node 325, as illustrated in FIG. 4. As another example, the system may generate a new subordinate dialog act node when two or more, but less than all children of an dialog act or subordinate dialog act node share an annotation tag with the same value. Thus, for example, the system generates subordinate dialog act node 345 of FIG. 4 and makes subordinate dialog act node 330 and subordinate dialog act node 345 children of node 345, while also moving the PD node from nodes 330 and 335 to node 345 in the annotation tree 320 of FIG. 4.

The system may assign an annotation identifier to each node (625) that is unique within the conversation. The system may also map a child node to its parent (630), e.g., by recording the parent annotation identifier in attributes of the child node. The system may also link any previous discourse nodes to their corresponding subsequent discourse node in another annotation tree (635). The system may generate an annotation record for each node (640), storing the annotation records in a data store. In some implementations, the system may include a process that runs periodically to add information to the annotation records. For example, the system may not have all the information it needs in real-time to make the links from the responses (e.g., the previous discourse nodes) to their corresponding requests (e.g., SD nodes). This can occur, for example when a user switches context in a conversation but then returns to the original context. Finding the correct request can require more processing time than a real-time linkage would allow or may be impossible in real-time. For example, in a current dialog a user may refer back to a task included in a dialog act from the previous week. At the time the annotation record for the dialog act of the previous week was written, the SD tag (subsequent discourse) may have been null or characterized differently. Only with the benefit of hindsight can the SD tag be added to the older annotation tree. This example also illustrates the benefits of the annotation records being an unordered list. Because the list is unordered the periodically run process can add additional annotations discovered via the benefit of hindsight. Thus, in some implementations the system may perform additional analysis on a periodic basis (e.g., nightly, hourly, weekly) in an "offline" or "batch" mode to add the links (step 635) to the annotation records. Such additional information may include annotations that indicate additional actions taken by the user, such as pressing a power-off button to terminate the conversation. Such additional information may include adding or changing the tags for a dialog act, e.g., adding an SD tag with the benefit of hindsight. In addition, in some implementations the system may provide sample annotation records for a conversation to a human rater who verifies that the links are proper.

The offline or batch processing may also be part of a quality analysis process that identifies areas of improvement in the dialog generated by the system, when users have given permission for such analysis. The labels and hierarchical nature of the annotation records allow for targeted, specific queries of the records. For example, the hierarchical, unordered annotation records can be queried to identify particular areas of failure. As one specific example, the annotation records can be queried to identify the most frequently corrected information fields in an action, e.g., identifying from ten data fields in a restaurant reservation, which information field is corrected most often as part of the reservation action. As another example, the annotation records can be queried to identify situations where the user responds to a question with a question rather than a statement, or responds with an answer but asks a follow-on question. For example, the electronic assistant may ask for a reservation time for a restaurant and the user responds "6 pm, but do they have high chairs?" This indicates the user may want high chair information included in future reservations, especially if this occurs for the user more than once. In some implementations, such analysis can take place on the user device. In some implementations, with user permission, annotation records may be shared with a server, after removing any personally identifying information, so that patterns can be identified across users. In some implementations, the annotation records can be provided to machine-learned models to identify patterns of failure, e.g., assistant responses which led to questions, abandonment, or verbal indications of annoyance (e.g., a sigh). Identifying these bottleneck and failure patterns can help developers of the electronic assistant identify and improve specific functionality in the electronic assistant, which improves dialog responses and interactions with the user. The linkages in the annotation records make such analysis possible.

FIG. 7 shows an example of a generic computer device 700, which may be operated as server 110, and/or client 150 of FIG. 1, which may be used with the techniques described here. Computing device 700 is intended to represent various example forms of computing devices, such as laptops, desktops, workstations, personal digital assistants, cellular telephones, smartphones, tablets, servers, and other computing devices, including wearable devices. The components shown here, their connections and relationships, and their functions, are meant to be examples only, and are not meant to limit implementations of the inventions described and/or claimed in this document.

Computing device 700 includes a processor 702, memory 704, a storage device 706, and expansion ports 710 connected via an interface 708. In some implementations, computing device 700 may include transceiver 746, communication interface 744, and a GPS (Global Positioning System) receiver module 748, among other components, connected via interface 708. Device 700 may communicate wirelessly through communication interface 744, which may include digital signal processing circuitry where necessary. Each of the components 702, 704, 706, 708, 710, 740, 744, 746, and 748 may be mounted on a common motherboard or in other manners as appropriate.

The processor 702 can process instructions for execution within the computing device 700, including instructions stored in the memory 704 or on the storage device 706 to display graphical information for a GUI on an external input/output device, such as display 716. Display 716 may be a monitor or a flat touchscreen display. In some implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk. In some implementations, the memory 704 may include expansion memory provided through an expansion interface.

The storage device 706 is capable of providing mass storage for the computing device 700. In one implementation, the storage device 706 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 704, the storage device 706, or memory on processor 702.

The interface 708 may be a high speed controller that manages bandwidth-intensive operations for the computing device 700 or a low speed controller that manages lower bandwidth-intensive operations, or a combination of such controllers. An external interface 740 may be provided so as to enable near area communication of device 700 with other devices. In some implementations, controller 708 may be coupled to storage device 706 and expansion port 714. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 730, or multiple times in a group of such servers. It may also be implemented as part of a rack server system. In addition, it may be implemented in a computing device, such as a laptop computer 732, personal computer 734, or tablet/smart phone 736. An entire system may be made up of multiple computing devices 700 communicating with each other. Other configurations are possible.

FIG. 8 shows an example of a generic computer device 800, which may be server 110 of FIG. 1, which may be used with the techniques described here. Computing device 800 is intended to represent various example forms of large-scale data processing devices, such as servers, blade servers, datacenters, mainframes, and other large-scale computing devices. Computing device 800 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 800 may include any number of computing devices 880. Computing devices 880 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 880*a* includes multiple racks 858*a*-858*n*. Each rack may include one or more processors, such as processors 852*a*-852*n* and 862*a*-862*n*. The processors may include data processors, network attached storage devices, and other computer controlled devices. In some implementations, one processor may operate as a master processor and control the scheduling and data distribution tasks. Processors may be interconnected through one or more rack switches 858, and one or more racks may be connected through switch 878. Switch 878 may handle communications between multiple connected computing devices 880.

Each rack may include memory, such as memory 854 and memory 864, and storage, such as 856 and 866. Storage 856 and 866 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 856 or 866 may be shared between multiple processors, multiple racks, or multiple computing devices and may include a computer-readable medium storing instructions executable by one or more of the processors. Memory 854 and 864 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 854 may also be shared between processors 852*a*-852*n*. Data structures, such as an index, may be stored, for example, across storage 856 and memory 854. Computing device 880 may include other components not shown, such as controllers, buses, input/output devices, communications modules, etc.

An entire system, such as system 100, may be made up of multiple computing devices 880 communicating with each other. For example, device 880*a* may communicate with devices 880*b*, 880*c*, and 880*d*, and these may collectively be known as system 100. As another example, system 100 of FIG. 1 may include one or more computing devices 880. Some of the computing devices may be located geographically close to each other, and others may be located geographically distant. The layout of system 800 is an example only and the system may take on other layouts or configurations.

Figure 9:
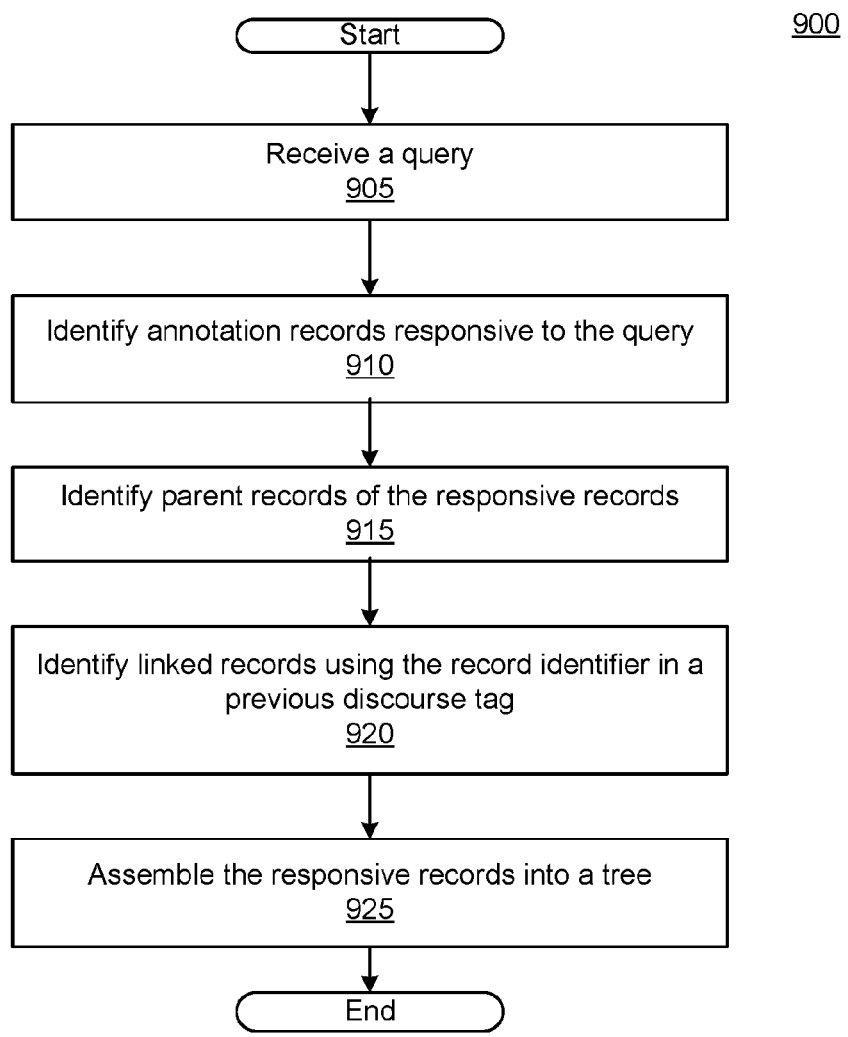
FIG. 9 shows an example flow diagram of an example process for assembling records in a hierarchical annotation structure of conversation dialog acts in response to receiving a query, in accordance with disclosed implementations.

FIG. 9 illustrates a flow diagram of an example process 900 for assembling records in a hierarchical annotation structure of conversation dialog acts in response to receiving a query, in accordance with disclosed implementations. Process 900 may be performed by a hierarchical annotation system, such as system 100 of FIG. 1 or system 200 of FIG. 2. The order of the steps in process 900 is exemplary and the order can be re-arranged, some steps may be combined, and some steps may be optional.

Process 900 may begin with a system receiving a query (905). The system may identify annotation records responsive to the query (910), and identify parent records of the responsive records (915). Further, the system may identify linked records using the record identifier in a previous discourse tag (920). Moreover, the system may reassemble the responsive records into a tree.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   generating a first annotation tree for an annotated dialog act, the first annotation tree including a root node for the annotated dialog act and leaf nodes for each non-null annotation tag for the annotated dialog act, the annotated dialog act being associated with a conversation identifier of a conversation, and the leaf nodes each including a previous discourse node corresponding to a previous discourse tag in the annotated dialog act;
   generating an annotation identifier for each node in the first annotation tree, each annotation identifier being unique within the conversation identifier; and
   writing, based on the first annotation tree, a corresponding annotation record for each node of the first annotation tree, wherein corresponding annotation records are independent data structures that link each corresponding node of the first annotation tree to one or more corresponding additional nodes of the first annotation tree, and wherein:
     a first corresponding annotation record for the root node lacks a parent identifier,
     one or more second corresponding annotation records for non-root nodes include a parent identifier, the parent identifier referencing the annotation identifier of the parent, and
     a given corresponding annotation record for the node corresponding to the previous discourse node includes a given annotation identifier for a corresponding subsequent discourse record, the subsequent discourse record corresponding to a given leaf node in a second annotation tree that is also associated with the conversation identifier.

2. The method of claim 1, wherein generating the annotation tree for the annotated dialog act includes:
   determining that a first subordinate dialog act and a second subordinate dialog act share a common tag and a common parent; and
   inserting a node in the annotation tree that is a child of a node for the common parent and is a parent of a node for the first subordinate dialog act, of a node for the second subordinate dialog act, and of a node for the common tag,
     wherein the node for the first subordinate dialog act and the node for the second subordinate dialog act each lack a child node corresponding to the common tag.

3. The method of claim 1, further comprising:
   accessing the respective annotation records in response to a query; and
   returning one or more annotation records determined to be responsive to the query.

4. The method of claim 1, further comprising:
   accessing the corresponding annotation records to generate training examples for a dialog management engine; and
   training the dialog management engine using the training examples.

5. The method of claim 1, wherein the corresponding annotation record for each node includes text corresponding to the node.

6. The method of claim 1, wherein the corresponding annotation records are stored in an unordered list.

7. The method of claim 1, wherein the first annotation tree represents a first turn in the conversation and the second annotation tree represents a second turn in the conversation, the first turn and the second turn are separated by at least one intervening turn.

8. A system comprising:
   at least one processor;
   a dialog input device;
   a dialog output device; and
   memory storing instructions that, when executed by the at least one processor performs operations including:
     receiving input dialog acts of a dialog act via the dialog input device and receiving output dialog acts of the dialog act via the dialog output device,
     generating, based on the input dialog acts and based on the output dialog acts, an annotation tree for the dialog act, the annotation tree for the dialog act including a plurality of nodes, and
     generating, based on annotations of the input dialog acts and annotations of the output dialog acts included in the annotation tree, hierarchical annotation records for the dialog act, wherein the hierarchical annotation records for the dialog act are independent data structures that link each corresponding node, of the plurality of nodes of the annotation tree, to one or more corresponding additional nodes, of the plurality of nodes of the annotation tree, and wherein the hierarchical annotation records for the dialog act include:
       a root record specifying a conversation identifier and a root record annotation identifier,
       a plurality of non-root records each including:
         a corresponding non-root record annotation identifier, and
         a parent identifier, the parent identifier being a given annotation identifier of another record, wherein at least some of the non-root records further include a corresponding annotation tag.

9. The system of claim 8, wherein the root record further specifies an indication of a speaker for the dialog act.

10. The system of claim 8, wherein the root record and at least some of the plurality of non-root records further includes an indication of a speaker for the dialog act.

11. The system of claim 8, wherein the corresponding annotation tag is selected from a group, the group including a subsequent discourse tag, a dialog act type, a dialog error, and a previous discourse tag.

12. The system of claim 11, wherein the corresponding annotation tag included in the at least some of the non-root records represents a previous discourse tag that identifies an additional corresponding annotation identifier of an additional corresponding non-root annotation record, and wherein the additional corresponding non-root annotation record includes at least an additional corresponding annotation tag that represents a subsequent discourse tag.

13. The system of claim 8, wherein at least some of the corresponding annotation tags represent a text span.

14. The system of claim 8, wherein at least one dialog act, of the input dialog acts, represents an operational action performed by a user of the system.

15. The system of claim 8, the memory further storing instructions that, when executed by the at least one processor, causes the system to perform operations including:
   determining that a first corresponding non-root record associated with a given root record for a first corresponding conversation identifier links to a second corresponding non-root record associated with an additional given root record for a second corresponding conversation identifier;
   generating a first new corresponding non-root record identifying the second corresponding non-root record in the parent identifier and having a first new corresponding annotation tag that represents a subsequent discourse; and
   generating a second new corresponding non-root record identifying the first corresponding non-root record in the parent identifier and having a second new corresponding annotation tag that represents a previous discourse that identifies the corresponding non-root record annotation identifier for the first new corresponding non-root record,
      wherein the first conversation identifier and the second conversation identifiers are not sequential.

16. A system comprising:
   at least one processor;
   a dialog input device;
   a dialog output device;
   a data store of hierarchical annotation records generated based on corresponding annotation trees, each of the corresponding annotation trees including a plurality of corresponding nodes, the hierarchical annotation records being independent data structures that link each corresponding node, of the plurality of corresponding nodes of the corresponding annotation trees, to one or more additional corresponding nodes, of the plurality of corresponding nodes of the corresponding annotation trees, the hierarchical annotation records including corresponding root records and corresponding non-root records for each of the corresponding annotation trees, each corresponding root record specifying a corresponding conversation identifier and a corresponding annotation identifier, each corresponding non-root record including:
      a corresponding annotation identifier,
      a corresponding parent identifier, the corresponding parent identifier being a given annotation identifier of an additional hierarchical annotation record, and
      at least some of the non-root records further including a corresponding annotation tag; and
   memory storing instructions that, when executed by the at least one processor performs operations including:
      receiving an input dialog act from the dialog input device,
      generating a first new corresponding root record and one or more first new corresponding non-root records for the input dialog act,
      receiving an output dialog act for output via the dialog output device that is responsive to the input dialog act,
      generating a second new corresponding root record and one or more second new corresponding non-root records for the output dialog act, at least one of the second new corresponding non-root records including a given annotation tag linking back to a given non-root annotation record of one or more of the first new corresponding non-root records, and
      causing (a) the first new corresponding root record and the one or more first new corresponding non-root records for the input dialog act and (b) the second new corresponding root record and the one or more second new corresponding non-root records for the output dialog act to be stored in the data store as a new hierarchical annotation record.

17. The system of claim 16, wherein linking back to the given non-root annotation record of one or more of the first new corresponding non-root records includes generating the given non-root annotation record with a subsequent discourse tag.

18. The system of claim 16, wherein each corresponding annotation tag is selected from a group, the group including a subsequent discourse tag, a dialog act type, and a previous discourse tag.

19. The system of claim 16, wherein the corresponding annotation tag of at least some of the one or more first new corresponding non-root nodes include a given annotation tag that represents a text span of the input dialog act.

* * * * *